(12) United States Patent
Robillard et al.

(10) Patent No.: US 9,506,821 B1
(45) Date of Patent: *Nov. 29, 2016

(54) SYSTEM AND METHOD FOR CONTROLLING FAN SPEED

(75) Inventors: Michael N. Robillard, Shrewsbury, MA (US); Robert M. Beauchamp, Milford, MA (US); Bassem Bishay, Natick, MA (US); David Boudreau, Methuen, MA (US); John K. Bowman, Brighton, MA (US); John V. Burroughs, East Sandwich, MA (US); Steven R. Cieluch, Allston, MA (US); James W. Espy, Andover, MA (US); Gordon A. Frye, Westborough, MA (US); Joseph P. King, Sterling, MA (US); Samuel Zeman, Sharon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 886 days.

This patent is subject to a terminal disclaimer.

(21) Appl. No.: 13/251,163

(22) Filed: Sep. 30, 2011

Related U.S. Application Data

(63) Continuation-in-part of application No. 12/640,732, filed on Dec. 17, 2009, now Pat. No. 8,311,764.

(51) Int. Cl.
  *G01K 11/00* (2006.01)
  *G01K 7/42* (2006.01)
  *G06F 1/20* (2006.01)

(52) U.S. Cl.
  CPC ............. *G01K 11/00* (2013.01); *G01K 7/427* (2013.01); *G06F 1/206* (2013.01)

(58) Field of Classification Search
  CPC ........ G01K 7/427; G01K 7/42; G01K 11/00; G06F 1/206
  USPC ....................................................... 702/130
  See application file for complete search history.

(56) References Cited

U.S. PATENT DOCUMENTS

| 6,363,449 | B1 | 3/2002 | Sides et al. |
|---|---|---|---|
| 6,545,438 | B1 | 4/2003 | Mays, II |
| 6,604,207 | B2 | 8/2003 | Sheikh et al. |
| 7,472,298 | B1 * | 12/2008 | Kimmel ................ G06F 1/3203 713/320 |
| 7,577,767 | B1 | 8/2009 | Robillard et al. |

(Continued)

OTHER PUBLICATIONS

Chassis Plans: "White Paper—Cooling and Noise" internet citation (Oct. 2008), Retrieved from the URL: http://www.chassis-plans.com/white_paper_cooling_and_noise.html on Apr. 21, 2014.*

(Continued)

*Primary Examiner* — Hyun Park
*Assistant Examiner* — Liam R Casey
(74) *Attorney, Agent, or Firm* — Brian J. Colandreo; Mark H. Whittenberger; Holland & Knight LLP

(57) ABSTRACT

A method and computer program product for determining an internal temperature of a computing device, a power consumption factor for the computing device, and an airflow factor for the computing device. An approximated ambient air temperature is generated based upon the internal temperature, power consumption factor, and the airflow factor. A workload factor is determined for the computing device and a fan speed for the computing device is controlled based at least in part upon the approximated ambient air temperature and the workload factor.

10 Claims, 3 Drawing Sheets

(56) References Cited

U.S. PATENT DOCUMENTS

| | | | | |
|---|---|---|---|---|
| 7,988,063 | B1* | 8/2011 | Dufresne, II | G06F 1/20 236/49.3 |
| 8,311,764 | B1* | 11/2012 | Robillard | G01K 7/427 702/130 |
| 2002/0042896 | A1 | 4/2002 | Johnson et al. | |
| 2002/0054477 | A1 | 5/2002 | Coffey et al. | |
| 2003/0214781 | A1* | 11/2003 | Kolb | G06F 1/206 361/679.33 |
| 2004/0193791 | A1 | 9/2004 | Felton et al. | |
| 2005/0259397 | A1* | 11/2005 | Bash | G06F 1/20 361/699 |
| 2008/0162952 | A1* | 7/2008 | Landers | G06F 1/3215 713/300 |
| 2009/0296342 | A1* | 12/2009 | Matteson | G06F 1/206 361/679.46 |
| 2010/0023295 | A1* | 1/2010 | Gross | G01K 7/42 702/130 |
| 2011/0010717 | A1* | 1/2011 | Yamaoka | G06F 1/3203 718/102 |
| 2011/0301777 | A1* | 12/2011 | Cox | G06F 1/206 700/299 |

OTHER PUBLICATIONS

Chassis Plans: "White Paper—Cooling and Noise" n internet citation (Oct. 2008), Retrieved from URL: http://www.chassis-plans.com/white_paper_cooling_and_noise.html on Apr. 21, 2014.*
Notice of Allowance issued on Jul. 10, 2012 in related U.S. Appl. No. 12/640,732, now U.S. Pat. No. 8,311,764.
Non-Final Office Action issued on Mar. 19, 2012 in related U.S. Appl. No. 12/640,732, now U.S. Pat. No. 8,311,764.

* cited by examiner

SYSTEM AND METHOD FOR CONTROLLING FAN SPEED

RELATED APPLICATION(S)

This application is a continuation-in-part of U.S. patent application Ser. No. 12/640,732, filed on 17 Dec. 2009, and entitled "System and Method for Approximating Ambient Temperature", the entire contents of which is herein incorporated by reference in its entirety.

This application is related to and hereby incorporates by reference in its entirety the subject matter of U.S. Pat. No. 7,577,767, issued on 18 Aug. 2009, and entitled "Data storage system having plural storage processors in a single chassis", which is attached hereto as Appendix A.

This application is related to and hereby incorporates by reference in its entirety the subject matter of U.S. Pat. No. 7,988,063, issued on 2 Aug. 2011, and entitled "Method for controlling cooling in a data storage system", which is attached hereto as Appendix B.

TECHNICAL FIELD

This disclosure relates to workload monitoring and, more particularly, to CPU workload monitoring.

BACKGROUND

Within data centers, it is often important to monitor the temperature of the various devices within the data center so that cooling systems may be adjusted to compensate for such variations in temperature. For example, the workload of the various processors included within the data center may be monitored so that the speed of the various fans included within the system may be adjusted to increase efficiency.

SUMMARY OF DISCLOSURE

In one implementation, a computer-implemented method includes determining an internal temperature of a computing device, a power consumption factor for the computing device, and an airflow factor for the computing device. An approximated ambient air temperature is generated based upon the internal temperature, power consumption factor, and the airflow factor. A workload factor is determined for the computing device and a fan speed for the computing device is controlled based at least in part upon the approximated ambient air temperature and the workload factor.

One or more of the following features may be included. Determining an internal temperature may include determining a midplane temperature. Determining an internal temperature may include determining an exhaust temperature. Determining an airflow factor may include monitoring a rotational speed of one or more cooling fans. Determining a power consumption factor may include determining a total power consumption of the computing device. Determining a power consumption factor further may include subtracting, from the total power consumption of the computing device, a total power consumption of non-disk drive devices. Generating an approximated ambient air temperature may include: determining a differential temperature; and subtracting the differential temperature from the internal temperature to define the approximated ambient air temperature. Determining a differential temperature may include determining the quotient of the power consumption factor and the airflow factor. Determining a differential temperature further may include: determining a product of the quotient and a first constant and adding the product to a second constant. At least one of the first and second constants may be determined empirically.

In another implementation of this disclosure, a computer program product resides on a computer readable medium and has a plurality of instructions stored on it. When executed by a processor, the instructions cause the processor to perform operations including determining an internal temperature of a computing device, a power consumption factor for the computing device, and an airflow factor for the computing device. An approximated ambient air temperature is generated based upon the internal temperature, power consumption factor, and the airflow factor. A workload factor is determined for the computing device and a fan speed for the computing device is controlled based at least in part upon the approximated ambient air temperature and the workload factor.

One or more of the following features may be included. Determining an internal temperature may include determining a midplane temperature. Determining an internal temperature may include determining an exhaust temperature. Determining an airflow factor may include monitoring a rotational speed of one or more cooling fans. Determining a power consumption factor may include determining a total power consumption of the computing device. Determining a power consumption factor further may include subtracting, from the total power consumption of the computing device, a total power consumption of non-disk drive devices. Generating an approximated ambient air temperature may include: determining a differential temperature; and subtracting the differential temperature from the internal temperature to define the approximated ambient air temperature. Determining a differential temperature may include determining the quotient of the power consumption factor and the airflow factor. Determining a differential temperature further may include: determining a product of the quotient and a first constant and adding the product to a second constant. At least one of the first and second constants may be determined empirically.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
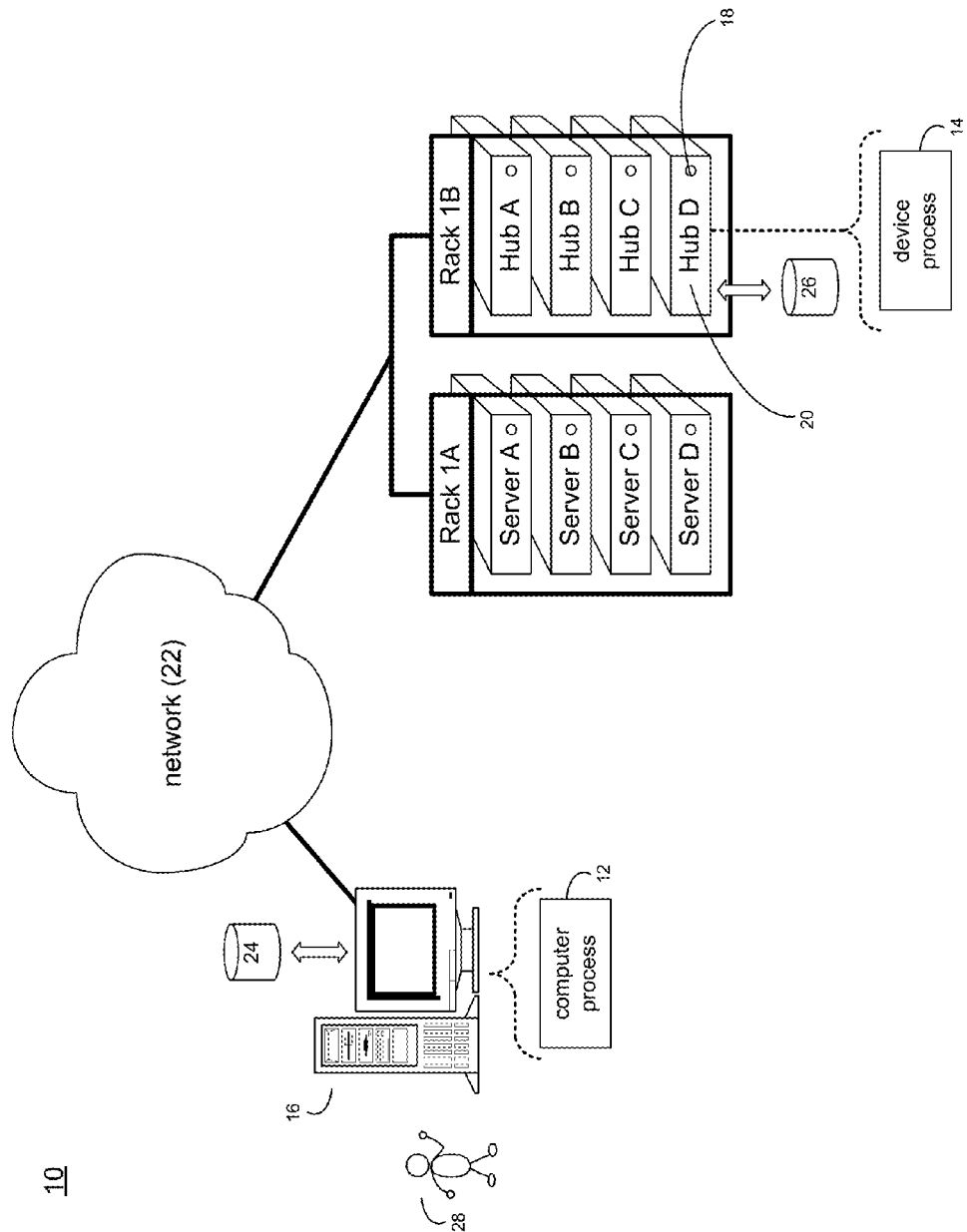
FIG. 1 is a diagrammatic view of a fan control process executed in whole or in part by a device coupled to a distributed computing network.
Figure 2:
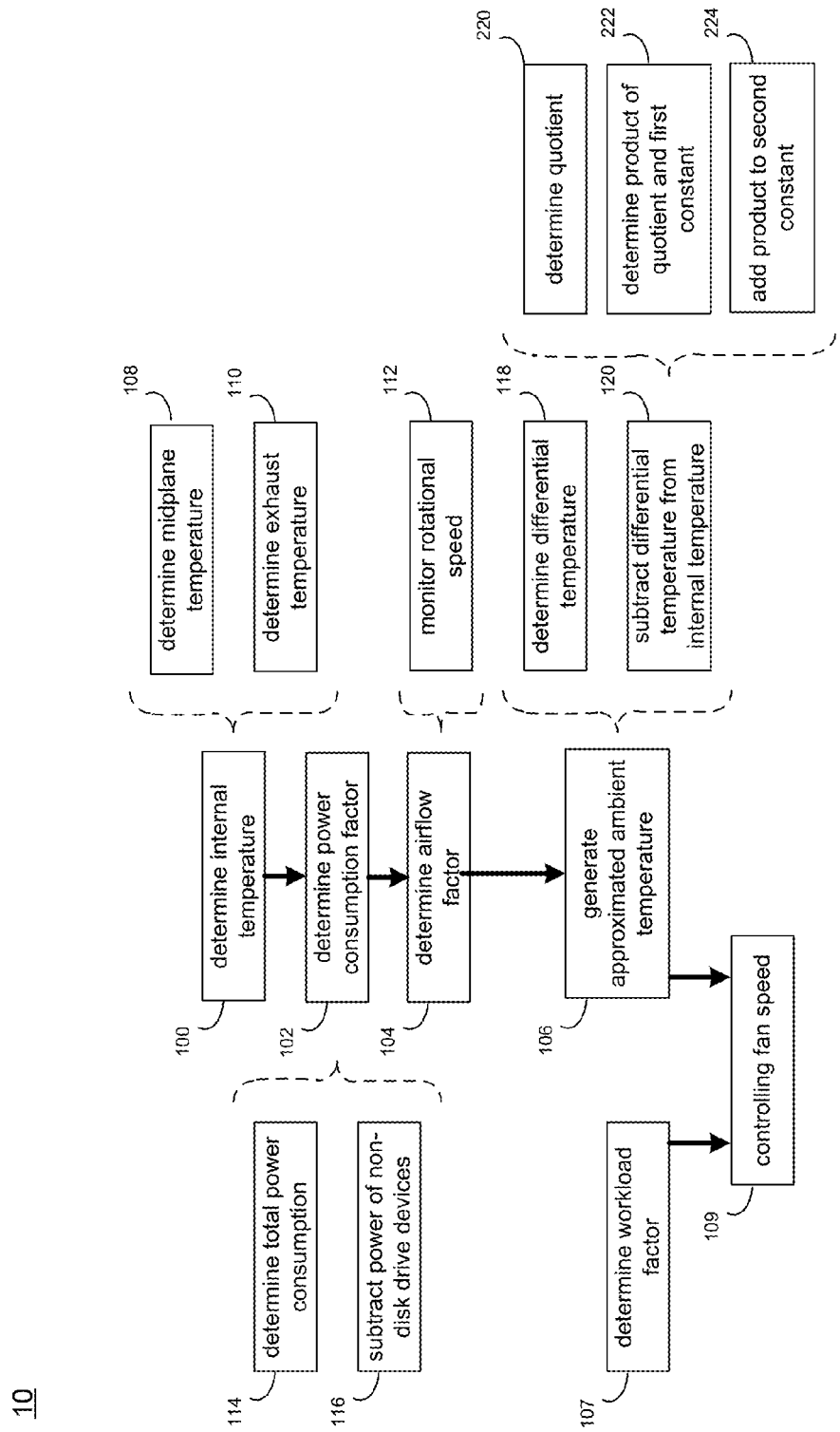
FIG. 2 is a flowchart of the fan control process of FIG. 1.
Figure 3:
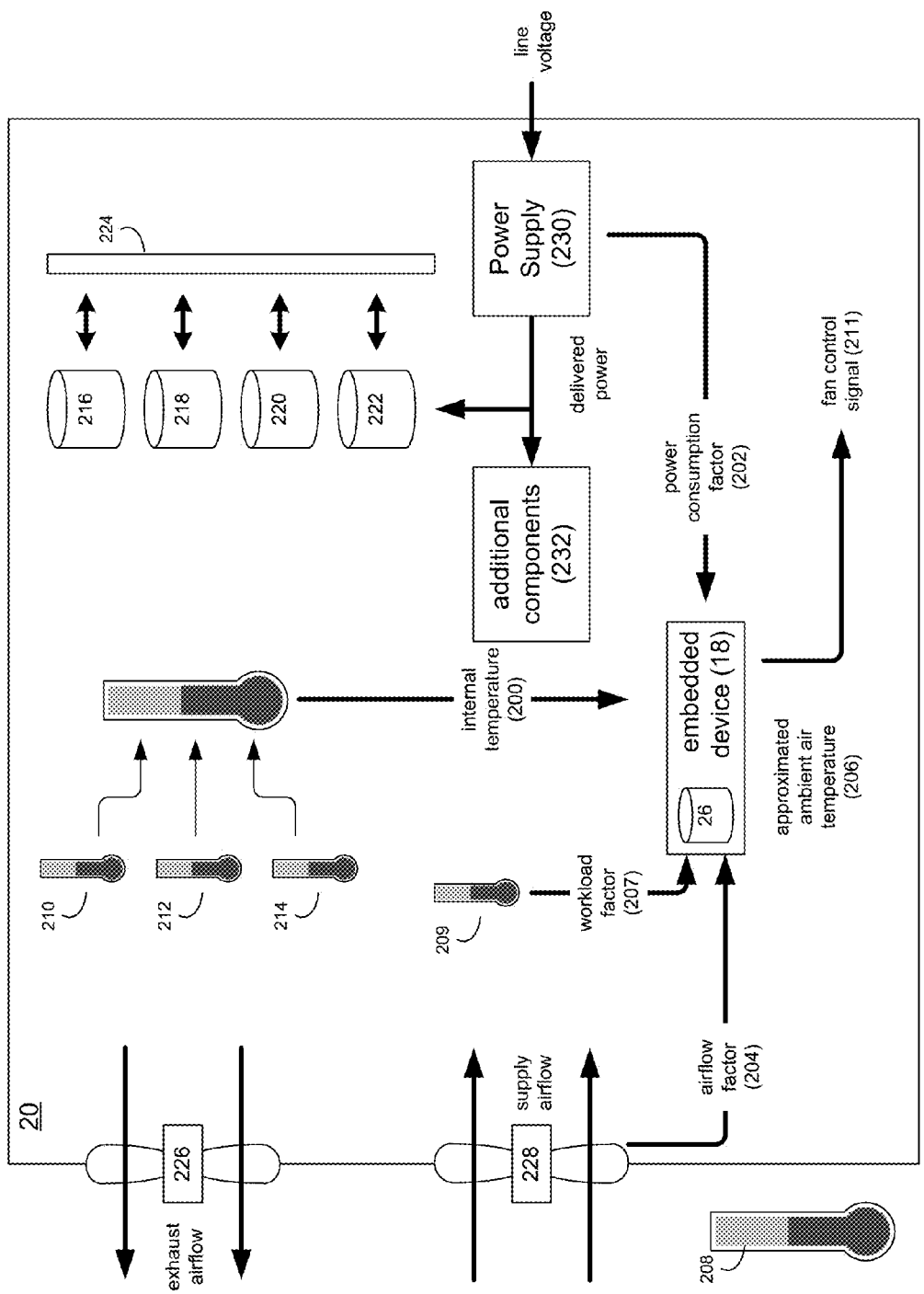
FIG. 3 is a diagrammatic view of a device that executes the fan control process of FIG. 1.

Referring to FIGS. 1-3, there is shown fan control process 10. Fan control process 10 may include one or more of computer process 12 and device process 14. Accordingly and for the following discussion, the fan control process will be described generally as fan control process 10, with the understanding that fan control process 10 may include one or more of computer process 12 and device process 14.

Computer process 12 may be executed (in whole or in part) by computer 16 (e.g., a single server computer, a plurality of server computers, a general purpose computer, a laptop computer, or a notebook computer). Device process 14 may be executed (in whole or in part) by embedded device 18. Embedded device 18 may be incorporated into, coupled with, or a portion of computing device 20, examples of which may include but are not limited to a server, a bridge, a router, a brouter, a switch, a gateway, a hub, a protocol convertor, a proxy device, a firewall, a network address translator, a multiplexor, a modem, a repeater, a storage module, and a power supply module. Examples of embedded device 18 may include but are not limited to a microprocessor and memory, an embedded controller, a single board computer, a programmable logic controller, and/or a portion of computing device 20.

As will be discussed below in greater detail, fan control process 10 may determine 100 an internal temperature 200 of a computing device (e.g., computing device 20); determine 102 a power consumption factor 202 (in watts) of the computing device; and determine 104 an airflow factor 204 (in CFM or cubic meters per minute) of the computing device. Fan control process 10 may generate 106 an approximated ambient air temperature 206 based upon internal temperature 200, power consumption factor 202, and airflow factor 204. A workload factor 207 may be determined 107 by fan control process 10 for the computing device (e.g., computing device 20) and a fan speed for the computing device (e.g., computing device 20) may be controlled 109 by fan control process 10 based at least in part upon approximated ambient air temperature 206 and workload factor 207.

Computer 16 may be coupled to network 22 (e.g., the Internet, an intranet, a local area network, a wide area network, and/or an extranet). Computer 16 may execute an operating system, examples of which may include but are not limited to Microsoft Windows Vista™, or Redhat Linux™.

The instruction sets and subroutines of computer process 12 (which may be grouped to form one or more software modules), which may be stored on a storage device 24 coupled to computer 16, may be executed by one or more processors (not shown) and one or more memory architectures (not shown) incorporated into computer 16. Storage device 24 may include but is not limited to a hard disk drive, a tape drive, an optical drive, a RAID array, a random access memory (RAM), or a read-only memory (ROM).

The instruction sets and subroutines of device process 14 (which may be grouped to form one or more software modules), which may be stored on storage device 26 coupled to the computing device (e.g., computing device 20), may be executed by one or more processors (not shown) and one or more memory architectures (not shown) incorporated into the computing device (e.g., computing device 20). Storage device 26 may include but is not limited to a hard disk drive, a tape drive, an optical drive, a RAID array, a random access memory (RAM), a read-only memory (ROM), or a flash memory device.

While computer 16 is shown hardwired to network 22, this is for illustrative purposes only and is not intended to be a limitation of this disclosure, as other configurations are possible and are considered to be within the scope of this disclosure. For example, computer 16 may be wirelessly coupled to network 22 via e.g., a wireless communication channel (not shown) established between computer 16 and a wireless access point (not shown), which may be directly coupled to network 22.

While computing device 20 is shown hardwired to network 22, this is for illustrative purposes only and is not intended to be a limitation of this disclosure, as other configurations are possible and are considered to be within the scope of this disclosure. For example, computing device 20 may be wirelessly coupled to network 22 via e.g., a wireless communication channel (not shown) established between computing device 20 and a wireless access point (not shown), which may be directly coupled to network 22.

The Fan Control Process:

As discussed above, fan control process 10 may determine 100 an internal temperature 200 of a computing device (e.g., computing device 20); determine 102 a power consumption factor 202 of the computing device (e.g., computing device 20); and determine 104 an airflow factor 204 of the computing device (e.g., computing device 20). Fan control process 10 may generate 106 approximated ambient air temperature 206 based upon internal temperature 200, power consumption factor 202, and airflow factor 204. Fan control process 10 may determine 107 workload factor 207 for the computing device (e.g., computing device 20) and a fan speed for the computing device (e.g., computing device 20) may be controlled 109 based at least in part upon approximated ambient air temperature 206 and workload factor 207.

Approximated ambient air temperature 206 generated by fan control process 10 may be indicative of the air temperature external to but proximate computing device 20 (as symbolized by thermometer 208). By generating approximated ambient air temperature 206 (as opposed to directly reading ambient air temperature 208), computing device 20 does not need to include an external temperature sensor.

The manner in which fan control process 10 determines 100 internal temperature 200 may vary depending upon the configuration of computing device 20. For example, computing devices (such as computing device 20) may include one or more temperature sensors (represented graphically as sensors 210, 212, 214). Examples of sensors 210, 212, 214 may include but are not limited to one or more thermistors.

Sensors 210, 212, 214 may be positioned at various locations within computing device 20. For example, assume that computing device 20 includes a plurality of storage devices 216, 218, 220, 222 that are coupled to midplane assembly 224. One or more of temperature sensors 210, 212, 214 may be mounted on/positioned proximate midplane assembly 224 so that a midplane temperature may be determined 108 by fan control process 10. Further still, one or more of temperature sensors 210, 212, 214 may be positioned proximate exhaust fan 226 so that the sensor(s) may sense the temperature of the exhaust airflow so that an exhaust temperature may be determined 110 by fan control process 10.

When determining 104 airflow factor 204, fan control process 10 may monitor 112 a rotational speed of one or more cooling fans (e.g., supply fan 228 and/or exhaust fan 226). Specifically and moving forward on the premise that the volume of air moved per fan rotation is known, airflow factor 204 (which may be indicative of the total quantity of air moved through computing device 20) may be determined 104 provided that the rotational speed of the cooling fan(s) is known.

When determining 102 power consumption factor 202, fan control process 10 may need to take into account a few factors (e.g., the position of the temperature sensor(s) being monitored. For example, assume that the temperature being monitored is the temperature of the exhaust airflow via a temperature sensor positioned proximate exhaust fan 226.

Since (in this example) the exhaust airflow passing through exhaust fan 226 is indicative of an homogenized temperature of the inside of computing device 20, fan control process 10 may determine 114 a total power consumption of computing device 20. The total power consumption of computing device 20 is of interest because exhaust fan 226 is exhausting all of the air from computing device 20.

Conversely, the calculations may be different if the temperature sensor(s) were positioned to monitor the temperature within a specific portion of computing device 20. In that case, fan control process 10 may isolate the energy supplied to the portion of computing device 20 proximate the sensor(s) being monitored.

For example, assume that the sensor(s) being monitored are located on midplane 224 of computing device 20. Accordingly, the temperature proximate midplane 224 may vary in accordance with the power consumption of the components/circuits proximate the sensor(s) being monitored. Therefore and for this particular example, fan control process 10 may determine 114 a total power consumption of computing device 20 and subtract 116, from the determined total power consumption of computing device 20, a total power consumption for all non-disk drive devices.

Specifically, assume that fan control process 10 determines 114 that five hundred watts is being provided by power supply 230. However, assume that two hundred of those five hundred watts is being provided to additional components 232 included within computing device 20, examples of which include but are not limited to e.g., storage controllers, link controller cards, etc.). Typically, the power consumptions of certain additional components 232 (e.g., link controller cards) may be known and constant. However, the power consumption of other additional components (e.g., storage processors) may vary. Accordingly, for those additional components that have varying levels of power consumption, additional monitoring may need to be performed to determine the actual power consumption level of the "varying" additional components. Once the power consumption of additional components 232 is determined (via e.g., applying a constant value and/or monitoring actual consumption), this amount (e.g., two hundred watts) may be subtracted 116 from the previously determined 114 total power consumption of e.g., five hundred watts. Accordingly and in this particular example, the power consumption factor 202 for the midplane portion of computing device 20 (i.e., the portion near the relevant temperature sensor(s) is determined to be three hundred watts.

Once fan control process 10 determines 100, 102, 104 internal temperature 200, power consumption factor 202 and airflow factor 204, fan control process 10 may generate 106 approximated ambient air temperature 206. Generating 106 approximated ambient air temperature 206 may include determining 118 a differential temperature and subtracting 120 the differential temperature from the internal temperature measured to define approximated ambient air temperature 206.

When determining 118 a differential temperature, a linear relationship may be utilized. For example, such a relationship may be defined as follows:

$$Y=MX+B$$

wherein Y is the differential temperature, X is the quotient of power consumption factor 202 (in watts) and airflow factor 204 (in CFM or cubic meters per minute). M and B may be constants that may be determined empirically and may vary from device to device and in accordance with the location of the temperature sensors.

Accordingly, when determining 118 a differential temperature, fan control process 10 may determine 220 quotient (X) of the power consumption factor and the airflow factor; determine 222 a product of quotient (X) and first constant (M) and add 224 the product to second constant (B).

In addition to storage processors, other devices may have varying levels of power consumption and generate varying levels of heat. For example, disk drives (e.g., storage devices 216, 218, 220, 222) have a considerable level of thermal mass and, therefore, may take considerable time (e.g., thirty minutes) for their temperature to stabilize. Accordingly, when initially started (or after a reset), fan control process 10 may not report approximated ambient air temperature 206 until after such stabilization has occurred. Additionally, fan control process 10 may be configured so that approximated ambient air temperature 206 is not reported while e.g., fault conditions are occurring and/or field replaceable units are removed, When determining 100 the internal temperature, fan control process 10 may be configured to average the temperature reading across sensors and/or across time. For example, fan control process 10 may average temperature readings across time periods from thirty seconds to thirty minutes.

Once fan control process 10 generates 106 the approximated ambient air temperature 206, approximated ambient air temperature 206 may be retrieved by user 28 via computing process 12. As discussed above, computing process 12 (which may be executed on computer 16) may interface with device process 14 (which is executed on embedded device 18) via e.g., network 22. Alternatively, approximated ambient air temperature 206 may be retrieved using computing device 20 if the appropriate interface (not shown) is included within computing device 20.

As discussed above, fan control process 10 may determine 107 workload factor 207 for the computing device (e.g., computing device 20) and a fan speed for the computing device (e.g., computing device 20) may be controlled 109 (via fan control signal 211) based at least in part upon approximated ambient air temperature 206 and workload factor 207.

The above-described workload factor 207 may provide information concerning the thermal temperature of one or more devices to approximate the workload currently being experienced by the device being monitored. Accordingly, one or more thermal sensors (e.g., sensor 209) may be placed upon e.g., the microprocessors included within the computing device (e.g., computing device 20) so that the workload being experienced by each of these devices may be approximated. For example, if the computing device includes a single microprocessor (not shown), a single thermal sensor may be used by fan control process 10 to determine 107 workload factor 207. However, if multiple microprocessors (not shown) are included within the computing device (e.g., computing device 20), multiple thermal sensors may be employed. The signals received from each of these thermal sensors may be averaged (using a single averaging circuit/algorithm; not shown) and/or may be prioritized in accordance with one or more weighting factors (e.g., the temperature of higher importance components are more influential on fan control than those of lower importance components).

Once fan control process 10 determines 107 workload factor 207, workload factor 207 may be used in combination with approximated ambient air temperature 206 to control 109 (via fan control signal 211) the speed of one or more fans (e.g., fan 226, fan 228, microprocessor cooling fans (not shown) and memory system cooling fans (not shown)) included within the computing device.

For example, a low approximated ambient air temperature 206 in combination with a low workload factor 207 may result in one or more of the fans (e.g., fan 226, fan 228, microprocessor cooling fans (not shown) and memory system cooling fans (not shown)) being set to a lowest fan speed (to provide minimum cooling) via fan control signal 211. Conversely, a high approximated ambient air temperature 206 in combination with a high workload factor 207 may result in one or more of the fans (e.g., fan 226, fan 228, microprocessor cooling fans (not shown) and memory system cooling fans (not shown)) being set to a highest fan speed (to provide maximum cooling) via fan control signal 211. Further, various other combinations of approximated ambient air temperature 206 and workload factor 207 may result in one or more of the fans (e.g., fan 226, fan 228, microprocessor cooling fans (not shown) and memory system cooling fans (not shown)) being set to an intermediate fan speed (to provide an intermediate level of cooling) via fan control signal 211.

A number of implementations have been described. Nevertheless, it will be understood that various modifications may be made. Accordingly, other implementations are within the scope of the following claims.

What is claimed is:

1. A computer-implemented method comprising:
   determining an internal temperature of a computing device having one or more non-disk drive devices and one or more disk drive devices, wherein determining an internal temperature includes determining a midplane temperature via one or more temperature sensors mounted on a midplane assembly of the computing device;
   determining a power consumption factor for the computing device, wherein determining the power consumption factor includes determining a total power consumption of the computing device, determining a total power consumption of the one or more non-disk drive devices of the computing device and within the computing device, and further includes subtracting, from the total power consumption of the computing device, the total power consumption of the one or more non-disk drive devices, wherein the one or more non-disk drive devices includes at least one of a storage controller and a link controller card;
   determining an airflow factor for the computing device indicating a total quantity of air moving through the computing device, including monitoring a rotational speed of one or more cooling fans to determine a volume of air moved per fan rotation;
   generating an approximated ambient air temperature based upon the internal temperature and midplane temperature, power consumption factor, and the airflow factor, wherein generating an approximated ambient air temperature includes determining a differential temperature based upon the power consumption factor, and the airflow factor, and subtracting the differential temperature from the internal temperature to define the approximated ambient air temperature;
   determining a workload factor for the computing device; and
   controlling a fan speed for each of an exhaust fan, a supply fan, a microprocessor cooling fan and a memory system cooling fan associated with the computing device based at least in part upon the approximated ambient air temperature and the workload factor.

2. The computer-implemented method of claim 1 wherein determining an internal temperature includes:
   determining an exhaust temperature.

3. The computer-implemented method of claim 1 wherein determining the differential temperature includes:
   determining the quotient of the power consumption factor and the airflow factor.

4. The computer-implemented method of claim 3 wherein determining the differential temperature further includes:
   determining a product of the quotient and a first constant and adding the product to a second constant.

5. The computer-implemented method of claim 4 wherein at least one of the first and second constants is determined empirically.

6. A computer program product residing on a non-transitory computer readable medium having a plurality of instructions stored thereon that, when executed by a processor, cause the processor to perform operations comprising:
   determining an internal temperature of a computing device having one or more non-disk drive devices and one or more disk drive devices, wherein determining an internal temperature includes determining a midplane temperature via one or more temperature sensors mounted on a midplane assembly of the computing device;
   determining a power consumption factor for the computing device, wherein determining the power consumption factor includes determining a total power consumption of the computing device, determining a total power consumption of the one or more non-disk drive devices of the computing device and within the computing device, and further includes subtracting, from the total power consumption of the computing device, the total power consumption of the one or more non-disk drive devices, wherein the one or more non-disk drive devices includes at least one of a storage controller and a link controller card;
   determining an airflow factor for the computing device indicating a total quantity of air moving through the computing device, including monitoring a rotational speed of one or more cooling fans to determine a volume of air moved per fan rotation;
   generating an approximated ambient air temperature based upon the internal temperature and midplane temperature, power consumption factor, and the airflow factor, wherein generating an approximated ambient air temperature includes determining a differential temperature based upon the power consumption factor, and the airflow factor, and subtracting the differential temperature from the internal temperature to define the approximated ambient air temperature;
   determining a workload factor for the computing device; and
   controlling a fan speed for each of an exhaust fan, a supply fan, a microprocessor cooling fan and a memory system cooling fan associated with the computing device based at least in part upon the approximated ambient air temperature and the workload factor.

7. The computer program product of claim 6 wherein the instructions for determining an internal temperature include instructions for:
   determining an exhaust temperature.

8. The computer program product of claim 6 wherein the instructions for determining the differential temperature include instructions for:
   determining the quotient of the power consumption factor and the airflow factor.

9. The computer program product of claim 8 wherein the instructions for determining the differential temperature further include instructions for:
 determining a product of the quotient and a first constant and adding the product to a second constant.

10. The computer program product of claim 9 wherein at least one of the first and second constants is determined empirically.

\* \* \* \* \*